United States Patent [19]

Andrusko

[11] Patent Number: 5,182,162
[45] Date of Patent: Jan. 26, 1993

[54] SELF-BONDED NONWOVEN WEB AND NET-LIKE WEB COMPOSITES

[75] Inventor: Frank G. Andrusko, Alpharetta, Ga.

[73] Assignee: Amoco Corporation, Chicago, Ill.

[21] Appl. No.: 602,519

[22] Filed: Oct. 24, 1990

[51] Int. Cl.$^5$ .............................................. B32B 5/06
[52] U.S. Cl. .................................. 428/219; 428/138;
428/288; 428/296; 428/284; 428/286; 428/297;
428/298; 428/332; 428/340; 428/474.4;
428/475.2; 428/480; 428/482; 428/95;
264/DIG. 81
[58] Field of Search ............... 428/474.4, 475.2, 480,
428/482, 332, 340, 296, 288, 903, 219, 284, 286,
297, 298, 138; 264/DIG. 81

[56] References Cited

U.S. PATENT DOCUMENTS

| | | | |
|---|---|---|---|
| 3,683,921 | 8/1972 | Brooks et al. | 128/296 |
| 3,957,554 | 5/1976 | Sundin | 156/62.6 |
| 4,013,816 | 3/1977 | Sabee et al. | 428/288 |
| 4,052,243 | 10/1977 | Yazawa et al. | 156/256 |
| 4,302,495 | 11/1981 | Marra | 428/110 |
| 4,340,563 | 7/1982 | Appel | 264/581 |
| 4,656,082 | 4/1987 | Goodacre et al. | 428/248 |
| 4,681,781 | 7/1987 | Murray et al. | 428/35 |
| 4,790,736 | 12/1988 | Keuchel | 425/66 |
| 4,863,785 | 9/1989 | Berman et al. | 428/218 |
| 4,929,303 | 5/1990 | Sheth | 156/209 |
| 5,073,436 | 12/1991 | Antonacci et al. | 428/219 |

Primary Examiner—George F. Lesmes
Assistant Examiner—Beverly A. Pawlikowski
Attorney, Agent, or Firm—Robert G. Ladd; Stephen L. Hensley; Frank J. Sroka

[57] ABSTRACT

A self-bonded nonwoven web and thermoplastic net-like web composite comprising at least one layer of a uniform basis weight self-bonded, fibrous nonwoven web and at least one layer of a thermoplastic net-like web for producing stable fabric useful for carpet backing and packaging applications.

20 Claims, 2 Drawing Sheets

SELF-BONDED NONWOVEN WEB AND NET-LIKE WEB COMPOSITES

FIELD OF INVENTION

This invention relates to composites comprising at least one layer of a uniform basis weight self-bonded, fibrous nonwoven web comprising substantially randomly disposed, substantially continuous thermoplastic filaments adhered to at least one layer of a thermoplastic net-like web that produce stable fabric useful in numerous applications such as primary carpet backing, wall covering backing, packaging and the like.

BACKGROUND OF THE INVENTION

Thermoplastic net-like webs including cross-laminated webs formed from two or more layers of network structures having the same or different configurations provide webs which can have high strength and tear resistance in more than one direction. Such webs have been found useful for reinforcing materials such as paper products, films, foils and others.

Spunbond processes can produce polymeric nonwoven webs by extruding a multiplicity of continuous thermoplastic polymer strands through a die in a downward direction onto a moving surface where the extruded strands are collected in a randomly distributed fashion. The randomly distributed strands are subsequently bonded together by thermobonding or needlepunching to provide sufficient integrity in a resulting nonwoven web of continuous fibers. One method of producing spunbond nonwoven webs is disclosed in U.S. Pat. No. 4,340,563. Spunbond webs are generally characterized by a relatively high ratio of strength to basis weight, isotropic strength, high porosity and abrasion resistance properties but generally are nonuniform in properties such as basis weight, coverage and appearance.

A major limitation of multilayer composites and laminates containing spunbond nonwoven webs is that the spunbond nonwoven web is typically not uniform in coverage and basis weight. In many applications, attempts are made to compensate for poor fabric aesthetics and limited or variable physical properties that result from this nonuniformity of coverage and basis weight by using spunbond webs that have a heavier basis weight than would normally be required by the particular application if the web had a more uniform coverage and basis weight. This, of course, adds to the cost of the composite product and contributes undesirable features to the composite such as stiffness and bulk.

In view of the limitations of spunbond nonwoven webs in multi-layer composites and laminates, there is a need for improved nonwoven web composites and, particularly, those wherein at least one layer of a self-bonded, fibrous nonwoven web having very uniform basis weight and coverage adhered to at least one layer of a cross-laminated thermoplastic net-like web.

U.S. Pat. No. 3,957,554 discloses a method for attaching plastic nets to nonwoven blankets without the use of adhesives.

U.S. Pat. No. 4,929,303 discloses a breathable polyolefin film laminated to a nonwoven cross-laminated open mesh fabric suitable as a housewrap.

U.S. Pat. No. 4,656,082 discloses a laminate material suitable for use in place of a safety mesh used in construction of roofing which has at least one inner layer of a woven material or an equivalent cross-laminated airy fabric adhesively bonded to each adjacent layer.

U.S. Pat. No. 4,052,243 discloses a method for producing a cross-laminated cloth-like product from wide warp and weft webs composed of fibers, filaments or yarns of organic or inorganic origin.

The patents described above do not disclose the invented self-bonded nonwoven web and cross-laminated thermoplastic net-like web composites comprising at least one layer of a uniform basis weight self-bonded, substantially randomly disposed, substantially continuous thermoplastic filaments fibrous nonwoven web comprising a high degree of basis weight uniformity to which is bonded at least one layer of a cross-laminated thermoplastic net-like web.

An object of the present invention is to provide improved composite fabric structures.

Another object of the present invention is to provide an improved self-bonded nonwoven web composite structure comprising at least one layer of a uniform basis weight self-bonded, fibrous nonwoven web having a plurality of substantially randomly disposed, substantially continuous thermoplastic filaments adhered to at least one layer of a thermoplastic net-like web.

The objects of the present invention are attained with a self-bonded nonwoven web and thermoplastic net-like web composite comprising, at least one layer of a uniform basis weight self-bonded, fibrous nonwoven web comprising a plurality of substantially randomly disposed, substantially continuous thermoplastic filaments wherein the web has a Basis Weight Uniformity Index (BWUI) of $1.0\pm0.05$ determined from average basis weights having standard deviations of less than 10% and is adhered to at least one layer of a thermoplastic net-like web.

The objects of the present invention are further attained with a self-bonded nonwoven web and cross-laminated thermoplastic net-like web composite having a basis weight of about 0.2 oz/yd$^2$ or greater comprising, at least one layer of a uniform basis weight self-bonded, fibrous nonwoven web having a basis weight of about 0.1 oz/yd$^2$ or greater and a BWUI of $1.0\pm0.05$ determined from average basis weights having standard deviations of less than 10% comprising a plurality of substantially randomly disposed, substantially continuous thermoplastic filaments wherein the filaments have deniers in the range of about 0.5 to about 20 and comprise a thermoplastic selected from the group consisting of polypropylene, a random copolymer of propylene and ethylene, and a blend of polypropylene and polybutene or linear low density polyethylene wherein the layer is adhered to at least one layer of a cross-laminated thermoplastic net-like web having a basis weight of about 0.1 oz/yd$^2$ or greater comprising a thermoplastic selected from the group consisting of polyolefins, combinations of polyolefins, and polyesters.

The objects of the present invention are still further attained with a self-bonded nonwoven web and cross-laminated thermoplastic net-like web composite having a basis weight of about 0.4 oz/yd$^2$ or greater comprising, at least one layer of a uniform basis weight self-bonded, fibrous nonwoven web having a basis weight of about 0.1 oz/yd$^2$ or greater and a BWUI of $1.0\pm0.05$ determined from average basis weights having standard deviations of less than 10% comprising a plurality of substantiality randomly disposed, substantially continuous thermoplastic filaments wherein the filaments comprise a thermoplastic selected from the group consisting of polypropylene, a random copolymer of propylene and ethylene and a blend of polypropylene and polybutene or linear low density polyethylene, a layer of a cross-laminated thermoplastic net-like web having a basis weight in the range of about 0.1 oz/yd² or greater comprising a thermoplastic selected from the group consisting of polyolefins, combinations of polyolefins and polyesters, and a layer of a polymeric coating composition having a basis weight of about 0.2 oz/yd² or greater comprising a composition selected from the group consisting of ethylene-methyl acrylate copolymer, ethylene-vinyl acetate copolymer and linear low density polyethylene located between and integrally adhered to the self-bonded nonwoven web layer and the cross-laminated thermoplastic net-like web layer.

Among the advantages obtained from the self-bonded nonwoven web and cross-laminated net-like web composites of the present invention are improved strength and stability, in both machine and transverse directions, and lower basis weights. These improvements are achieved due to the very uniform basis weight property of the self-bonded, fibrous nonwoven webs comprising a plurality of substantially randomly disposed, substantially continuous thermoplastic filaments together with the excellent machine and cross machine direction strength and flexibility of the net-like web. The very uniform basis weight of the self-bonded web enables a lower basis weight self-bonded web to be used compared with other materials such as spunbond fabrics and the like to provide coverage to the composites. The uniform basis weight and coverage of the self-bonded nonwoven web also enables lower basis weight polymeric coating compositions to be used to bond cross-laminated thermoplastic net-like webs to the self-bonded nonwoven webs. The use of blends of polypropylene and polybutene and/or linear low density polyethylene provides the self-bonded nonwoven web layers of the composites with a softer fabric hand such that the nonwoven webs have greater flexibility and/or less stiffness.

SUMMARY OF THE INVENTION

Briefly this invention provides an improved self-bonded nonwoven web composite structure comprising at least one layer of a uniform basis weight self-bonded, fibrous nonwoven web comprising a plurality of substantially randomly disposed, substantially continuous thermoplastic filaments wherein the web has a Basis Weight Uniformity Index of 1.0±0.05 determined from average basis weights having standard deviations of less than 10% adhered to at least one layer of a thermoplastic net-like web.

In another aspect, the present invention provides a self-bonded nonwoven web and cross-laminated thermoplastic net-like web composite having a basis weight of about 0.2 oz/yd² or greater comprising, at least one layer of a uniform basis weight self-bonded, fibrous nonwoven web having a basis weight of about 0.1 oz/yd² or greater and a BWUI of 1.0±0.05 determined from average basis weights having standard deviations of less than 10% comprising a plurality of substantially randomly disposed, substantially continuous thermoplastic filaments wherein the filaments have deniers in the range of about 0.5 to 20 and comprise a thermoplastic selected from the group consisting of polypropylene, a random copolymer of propylene and ethylene, and a blend of polypropylene and polybutene or linear low density polyethylene wherein the layer is adhered to at least one layer of a cross-laminated thermoplastic net-like web having a basis weight of about 0.1 oz/yd² or greater comprising a thermoplastic selected from the group consisting of polyolefins, combinations of polyolefins, and polyesters.

In a further aspect, the invention provides a self-bonded nonwoven web and cross-laminated thermoplastic net-like web composite having a basis weight of about 0.4 oz/yd² or greater comprising, at least one layer of a uniform basis weight self-bonded, fibrous nonwoven web having a basis weight of about 0.1 oz/yd² or greater and a BWUI of 1.0±0.05 determined from average basis weights having standard deviations of less than 10% comprising a plurality of substantiality randomly disposed, substantially continuous thermoplastic filaments wherein the filaments comprise a thermoplastic selected from the group consisting of polypropylene, a random copolymer of propylene and ethylene and a blend of polypropylene and polybutene or linear low density polyethylene, a layer of a cross-laminated thermoplastic net-like web having a basis weight in the range of about 0.1 oz/yd² or greater comprising a thermoplastic selected from the group consisting of polyolefins, combinations of polyolefins and polyesters, and a layer of a polymeric coating composition having a basis weight of about 0.2 oz/yd² or greater comprising a composition selected from the group consisting of ethylene-methyl acrylate copolymer, ethylene-vinyl acetate copolymer and linear low density polyethylene located between and integrally adhered to the self-bonded nonwoven web layer and to the cross-laminated thermoplastic net-like web layer.

DETAILED DESCRIPTION OF THE INVENTION

The self-bonded, fibrous nonwoven web and thermoplastic net-like web composite of the present invention comprises at least one layer of a uniform basis weight self-bonded, fibrous nonwoven web having a plurality of substantially randomly disposed, substantially continuous thermoplastic filaments and at least one layer of a thermoplastic net-like web.

By "nonwoven web" it is meant a web of material which has been formed without the use of weaving processes and which has a construction of individual fibers, filaments or threads which are substantially randomly disposed.

By "uniform basis weight nonwoven web" it is meant a nonwoven web comprising a plurality of substantially randomly disposed, substantially continuous polymeric filaments having a Basic Weight Uniformity Index (BWUI) of 1.0±0.05 determined from average bases weights having standard deviations of less than 10%. BWUI is defined as a ratio of an average unit area basis weight determined on a unit area sample of web to an average basis weight determined on an area of web, N times as large as the unit area, wherein N is about 12 to about 18, the unit area is 1 in$^2$ and wherein standard deviations of the average unit area basis weight and the average basis weight are less than 10% and the number of samples is sufficient to obtain basis weights at a 0.95 confidence interval. As used herein for the determination of BWUI, both the average unit area basis weight and the average area basis weight of the area N times must have standard deviations of less than 10% where "average" and "standard deviation" have the definitions generally ascribed to them by the science of statistics. Materials having BWUI's of determined from average basis weights having standard deviations of less than 10% which are determined from average basis weights having standard deviations greater than 10% for one or both of the averages do not represent a uniform basis weight nonwoven web as defined herein and are poorly suited for use in making the invented composites because the nonuniformity of basis weights may require heavier basis weight materials to be used to obtain the desired coverage and fabric aesthetics. Unit area samples below about 1 in$^2$ in area for webs which have particularly nonuniform basis weight and coverage would represent areas too small to give a meaningful interpretation of the unit area basis weight of the web. The samples on which the basis weights are determined can be any convenient shape, such as square, circular, diamond and the like, with the samples cut randomly from the fabric by punch dies, scissors and the like to assure uniformity of the sample area size. The larger area is about 12 to about 18 times the area of the unit area. The larger area is required to obtain an average basis weight for the web which will tend to "average out" the thick and thin areas of the web. The BWUI is then calculated by determining the ratio of the average unit area basis weight to the average larger area basis weight. For example, for a nonwoven web in which 60 samples of 1 in$^2$ squares determined to have an average basis weight of 0.993667 oz/yd$^2$ and a standard deviation (SD) of 0.0671443 (SD of 6.76% of the average) and 60 samples of 16 in$^2$ squares (N was 16) determined to have an average basis weight of 0.968667 oz/yd$^2$ and a standard deviation of 0.0493849 (SD of 5.10% of average), the calculated BWUI was 1.026. A BWUI of 1.0±0.05 indicates a web with a very uniform basis weight. Materials having BWUI values of less than 0.95 or more than 1.05 are not considered to have uniform basis weights as defined herein. Preferably, the uniform basis weight nonwoven web has a BWUI value of 1.0±0.03 determined from average basis weights having standard deviations of less than 10% and a basis weight of about 0.1 oz/yd$^2$ or greater.

By "self-bonded" it is meant that crystalline and oriented thermoplastic filaments or fibers in the nonwoven web adhere to each other at their contact points, thereby forming a self-bonded, fibrous, nonwoven web. Adhesion of the fibers may be due to fusion of the hot fibers as they contact each other, to entanglement of the fibers with each other or to a combination of fusion and entanglement. Of course, bonding does not occur at all contact points. Generally, however, the bonding of the fibers is such that the nonwoven web, after being laid down but before further treatment, has sufficient machine direction (MD) and cross-machine (CD) tensile strength to allow handling of the web without additional treatment. No foreign material need be present to promote bonding, and essentially no polymer flows to the intersection points as distinguished from that which occurs during the process of heat-bonding thermoplastic filaments. The bonds are weaker than the filaments as evidenced by the observation that an exertion of a force tending to disrupt the web, as in tufting, will fracture bonds before breaking filaments. Of course, the self-bonded web can be prebonded, e.g., by a calendering operation or with adhesive, if desired, but prebonding is not necessary due to the integrity of the self-bonded web as produced.

By "substantially continuous," in reference to polymeric filaments of the self-bonded webs, it is meant that a majority of the filaments or fibers formed are as substantially continuous nonbroken fibers as they are drawn and formed into the self-bonded web.

By "thermoplastic net-like web" it is meant a net-like structure comprising a multiplicity of aligned thermoplastic elements wherein a first segment of elements is aligned at about 45° to about 90° angle to a second segment of the elements and define a border for multiple void areas of the net-like nonwoven structures. The border which defines the void areas can be parallelogram-shaped such as a square, rectangle or diamond, or ellipse-shaped such as a circle or ellipse depending on the process of formation of the net-like web. The elements which define the border can be in the same plane or different planes. Elements in different planes can be laminated to each other. A preferred thermoplastic net-like web is a "cross-laminated thermoplastic net-like web" having a uniaxially oriented thermoplastic film laminated to a second oriented film of a thermoplastic such that the angle between the direction of orientation of each film is about 45° to about 90°. The webs can have continuous or discontinuous slits to form the void areas of the net-like web and can be formed by any suitable slitting or fibrillation process. The net-like structure can also be formed by other means such as forming on one side of a thermoplastic film a plurality of parallel continuous main ribs and forming on the opposite side of the film a plurality of parallel discontinuous tie ribs with the film being drawn in one or two directions to open the film into a network structure, punching or stamping out material from a film to form a pattern of holes in the film and stretching the film to elongate the spaces between the holes. The net-like structure can also be formed by extrusion with the net being oriented by a stretching operation. U.S. Pat. No. 4,929,303 discloses nonwoven cross-laminated fibrillated film fabrics of high density polyethylene as being further described in U.S. Pat. No. 4,681,781.

The thermoplastic net-like webs are made from film forming materials made into film which for cross-laminated thermoplastic net-like webs the films are oriented, slit and laminated together. Among the film forming materials which can be employed in making the cross-laminated thermoplastic net-like webs used for at least one layer of the composites of the instant invention are, thermoplastic synthetic polymers of polyolefins such as low density polyethylene, linear low density polyethylene, polypropylene, high density polyethylene, random copolymers of ethylene and propylene and combinations of these polymers; polyesters; polyamides; polyvinyl polymers such as polyvinylalcohol, polyvinylchloride, polyvinylacetate, polyvinylidenechloride and copolymers of the monomers of these polymers. Preferred materials are polyesters and polyolefins such as polypropylene, random copolymers of propylene and ethylene, and a combination of high density polyethylene and low density polyethylene.

These thermoplastic synthetic polymers may contain additives such as stabilizers, plasticizers, dyes, pigments, anti-slip agents, and foaming materials for foamed films and the like.

The thermoplastic material can be formed into a film by extrusion, coextrusion, casting, blowing or other film-forming methods. The thickness of the film can be any workable thickness with a typical thickness in the range of about 0.3 to about 20 mil. Coextruded films can be used containing two or more layers of thermoplastic material such as a layer of polypropylene and a layer of low density polyethylene wherein one layer can have about 5 to about 95% of the thickness and the second layer the remaining thickness.

Another type of coextruded film construction has a three-layer construction wherein each of the three layers can be a different thermoplastic polymer. More often however, the three-layer coextruded film is made with the same material for the exterior two layers and a different polymer for the interior layer. The interior layer can occupy about 5 to about 95% of the film thickness and typically ranges from about 50 to about 80% of the thickness with the outer two layers making up about 20 to about 50% of the thickness with the outer two layers typically having about equal thickness. Co-extruded films are typically used for making cross-laminated thermoplastic net-like webs in which one layer of film is cross-laminated (and bonded to a second layer of film with the exterior layers of the films containing compatible and easily bondable thermoplastic materials) such as low density polyethylene or linear low density polyethylene.

The film can be oriented by any suitable orientation process with typical stretch ratios of about 1.5 to about 15 dependent upon factors such as the thermoplastic used and the like. The temperature range for orienting the film and the speed at which the film is oriented are interrelated and dependent upon the thermoplastic used to make the film and other process parameters such as the stretch ratio.

Cross-laminated thermoplastic net-like webs can be made by bonding two or more layers of uniaxially oriented network structure films together wherein the angle between the direction of uniaxial orientation of the oriented films is between about 45° to about 90° in order to obtain good strength and tear resistance properties in more than one direction. The orientation and/or formation of the network structure in the films can be completed before the bonding operation or it can be done during the bonding process. Bonding of two or more layers of network structure films can be made by applying an adhesive between the layers and passing the layers through a heating chamber and calender rolls to bond the layers together, or by passing the layers through heated calender rolls to thermally bond the layers together, or by using ultrasonic bonding, spot bonding or any other suitable bonding technique.

As described in U.S. Pat. No. 4,929,303, the cross-laminated net-like webs can be nonwoven cross-laminated fibrillated film fabrics as described in U.S. Pat. No. 4,681,781. The cross-laminated fibrillated films are disclosed as high density polyethylene (HDPE) films having outer layers of ethylene-vinyl acetate coextruded on either side of the HDPE or heat seal layers. The films are fibrillated, and the resulting fibers are spread in at least two transverse directions at a strand count of about 6–10 per inch. The spread fibers are then cross-laminated by heat to produce a non-woven fabric of 3–5 mils thickness with about equal excellent machine direction and transverse direction strength properties used to form a thin, open mesh fabric of exceptional strength and durability. As disclosed in U.S. Pat. No. 4,929,303, the open mesh fabric can be laminated to material such as paper, film, foil, foam and other materials by lamination and extrusion coating techniques, or by sewing or heat sealing, adding significantly to the strength of the reinforced material without adding substantial bulk. The fabric may be of any suitable material, but is preferably low density polyethylene, linear low density polyethylene, polypropylene, blends of these polymers and polyesters. The open mesh fabric should have an elongation (ASTM D1682) less than about 30%; an Elmendorf tear strength (ASTM D689) of at least about 300 g; and a breakload (ASTM D1682) of at least about 15 lb/in. Reported uses of cross-laminated fibrillated film fabrics include shipping sacks for cement, fertilizer and resins, shopping, beach and tote bags, consumer and industrial packaging such as envelopes, form, fill and seal pouches, and tape backing, disposable clothing and sheeting, construction film and wraps, insulation backing, and reinforcement for reflective sheeting, tarpaulins, tent floors and geotextiles, and agricultural ground covers, insulation and shade cloth. Cross-laminated thermoplastic net-like webs are available from Amoco-Nisseki CLAF, Inc. under the designation of CLAF with product designations of CLAF S, CLAF SS, CLAF SSS, CLAF HS and CLAF MS.

The self-bonded, fibrous nonwoven web of substantially randomly disposed, substantially continuous polymeric filaments used in the multilayer self-bonded nonwoven web and cross-laminated thermoplastic net-like web composites of the present invention can be formed by the apparatus disclosed in U.S. Pat. No. 4,790,736, incorporated herein by reference. In a preferred embodiment, the self-bonded, fibrous nonwoven webs are prepared by:

(a) extruding a molten polymer through multiple orifices located in a rotating die;

(b) contacting said extruded polymer while hot as it exits said orifices with a fluid stream to form substantially continuous filaments and to draw said filaments into fibers having deniers in the range of about 0.5 to about 20; and (c) collecting said drawn fibers on a collection device whereby the filaments extruded through the die and drawn strike the collection device and sel-bond to each other to form the uniform basis weight self-bonded, fibrous nonwoven web.

A source of a liquid fiber forming material such as a thermoplastic melt is provided and pumped into a rotating die having a plurality of orifices such as spinnerets about its periphery. The rotating die is rotated at an adjustable speed such that the periphery of the die has a spinning speed of about 150 to about 2000 m/min. The spinning speed is calculated by multiplying the periphery circumference by the rotating die rotation speed measured in revolutions per minute.

The thermoplastic polymer melt is extruded through the plurality of orifices such as spinnerets located about the circumference of the rotating die. There can be multiple spinning orifices per spinneret and the diameter of an individual spinning orifice can be between about 0.1 to about 2.5 mm, preferably about 0.2 to about 1.0 mm. The length-to-diameter ratio of the spinneret orifice is about 1:1 to about 10:1. The particular geometrical configuration of the spinneret orifice can be circular, elliptical, trilobal or any other suitable configuration. Preferably, the configuration of the spinneret orifice is circular or trilobal. The rate of polymer extruded through the spinneret orifices can be about 0.05 lb/hr/orifice or greater. Preferably, for uniform production the extruded polymer rate is about 0.2 lb/hr/orifice or greater.

As the fibers extrude horizontally through spinneret orifices in the circumference of the rotating die, the fibers assume a helical orbit as the distance increases from the rotating die. The fluid stream which contacts the fibers can be directed downward onto the fibers, can be directed to surround the fibers or can be directed essentially parallel to the extruded fibers. The fluid stream is typically ambient air which can be conditioned by processes such as heating, cooling, humidifying or dehumidifying. A pressure blower fan can be used to generate a quench fluid stream such as an air stream. Polymer fibers extruded through the spinneret orifices of the rotary die are contacted by the quench fluid stream.

The quench fluid stream with air as the fluid can be directed radially above the fibers which are drawn toward the high velocity air stream as a result of a partial vacuum created in the vicinity of the fibers by the air stream. The polymer fibers then enter the high velocity air stream and are drawn, quenched and transported to a collection surface. The high velocity air, accelerated and distributed in a radial manner, contributes to the attenuation or drawing of the radially extruded thermoplastic melt fibers. The accelerated air velocities contribute to the placement or "laydown" of fibers onto a collection surface such as a circular fiber collector surface or collector plate such that self-bonded, fibrous, nonwoven webs are formed that exhibit improved properties, including increased tensile strength, lower elongation and more balanced physical properties in the machine direction and cross-machine direction from filaments having diameters ranging from about 0.5 to about 220 microns as well as webs which have a very uniform basis weight with BWUI's of 1.0±0.05 determined from average basis weights having standard deviations of less than 10%. Preferably, the filament deniers are in the range of about 0.5 to about 20, which for polypropylene corresponds to diameter of about 5 to about 220 microns.

The fibers are conveyed to the collector surface at elevated air speeds which promote entanglement of the fibers for web integrity. The fibers move at a speed dependent upon the speed of rotation of the rotating die as they are drawn down, and by the time the fibers reach the outer diameter of the orbit, they are not moving circumferentially, but are merely being laid down in that particular orbit basically one on top of another. The particular orbit may change depending upon variation of rotational speed of the die, polymer extrudate rate, polymer extrudate temperature and the like. External forces such as electrostatic charge, air pressure and the like can be used to alter the orbit and, therefore, deflect the fibers into different patterns.

The uniform basis weight self-bonded, fibrous nonwoven webs are produced by allowing the extruded thermoplastic fibers to contact each other as they are deposited on the collection surface. Many of the fibers, but not all, adhere to each other at their contact points, thereby forming a self-bonded, fibrous nonwoven web. Adhesion of the fibers may be due to material bonding such as fusion of hot fibers as they contact each other, to entanglement of fibers with each other or to a combination of fusion and entanglement. Generally, the adhesion of the fibers is such that the nonwoven web, after being laid down but before further treatment, has sufficient MD and CD strength to allow handling of the web without additional treatment, such as prebonding as generally required by spunbond nonwoven webs.

The uniform basis weight self-bonded nonwoven fabric conforms to the shape of the collection surface which can have various shapes, such as a cone-shaped inverted bucket, a moving screen or a flat surface in the shape of an annular strike plate located slightly below the elevation of the die and with the inner diameter of the annular strike plate being at an adjustable, lower elevation than the outer diameter of the strike plate and the like.

When an annular strike plate is used as the collection surface, fibers are bonded together during contact with each other and with the annular strike plate, and a nonwoven fabric is produced which is drawn back through the aperture of the annular strike plate as a tubular fabric. A stationary spreader can be supported below the annular strike plate to spread the fabric into a flat, two-ply fabric which can be collected by a take-up means such as a pull roll and winder and the like. In the alternative, a knife arrangement can be used to cut the tubular, two-ply fabric into a single-ply fabric which can be collected by a similar take-up means.

Temperature of the thermoplastic melt can affect the process stability for the particular thermoplastic used. The temperature must be sufficiently high so as to enable drawdown, but not too high so as to allow excessive thermal degradation of the thermoplastic.

Process parameters which can control fiber formation from thermoplastic polymers include: the spinneret orifice design, dimension and number, the extrusion rate of polymer through the orifices, the quench air velocity and the rotational speed of the die. The filament diameter can be influenced by all of the above parameters with filament diameter typically increasing with larger spinneret orifices, higher extrusion rates per orifice, lower air quench velocity and lower rotary die rotation with other parameters remaining constant. Productivity can be influenced by process parameters such as the dimension and number of spinneret orifices, the extrusion rate and, for a given denier fiber, the rotary die rotation and the like.

In general, any suitable thermoplastic resin can be used in making the self-bonded, fibrous nonwoven webs used to make the composites of the present invention. Suitable thermoplastic resins include polyolefins of branched and straight-chained olefins such as low density polyethylene, linear low density polyethylene, high density polyethylene, polypropylene, polybutene, polyamides, polyesters such as polyethylene terephthalate, combinations thereof and the like.

The term "polyolefins" is meant to include homopolymers, copolymers and blends of polymers prepared from at least 50 wt % of an unsaturated hydrocarbon monomer. Examples of such polyolefins include polyethylene, polystyrene, polyvinyl chloride, polyvinyl acetate, polyvinylidene chloride, polyacrylic acid, polymethacrylic acid, polymethyl methacrylate, polyethyl acrylate, polyacrylamide, polyacrylonitrile, polypropylene, polybutene-1, polybutene-2, polypentene-1, polypentene-2,poly-3-methylpentene-1, poly-4-methylpentene-1, polyisoprene, polychloroprene and the like.

Mixtures or blends of these thermoplastic resins and, optionally, thermoplastic elastomers such as polyurethanes and the like, elastomeric polymers such as copolymers of an isoolefin and a conjugated polyolefin, and copolymers of isobutylenes and the like can also be used.

Preferred thermoplastic resins include polyolefins such as polypropylene, random copolymers of ethylene and propylene, blends of polypropylene and polybutene or linear low density polyethylene, polyamides and polyesters.

The polypropylene used by itself or in blends with polybutene (PB) and/or linear low density polyethylene (LLDPE) preferably has a melt flow rate in the range of about 10 to about 80 g/10 min as measured by ASTM D-1238. Blends of polypropylene and polybutene and/or linear low density polyethylene provide uniform basis weight self-bonded nonwoven webs with softer hand such that the web has greater flexibility and/or less stiffness.

Additives such as colorants, pigments, dyes, opacifiers such as $TiO_2$, UV stabilizers, fire retardant compositions comprising one or more polyhalogenated organic compounds and antimony trioxide, processing stabilizers and the like can be incorporated into the polypropylene, thermoplastic resins and blends.

The blends of polypropylene and PB can be formulated by metering PB in liquid form into a compounding extruder by any suitable metering device by which the amount of PB being metered into the extruder can be controlled. PB can be obtained in various molecular weight grades with high molecular weight grades typically requiring heating to reduce the viscosity for ease of transferring the PB. A stabilizer additive package can be added to the blend of polypropylene and PB if desired. Polybutenes suitable for use can have a number average molecular weight measured by vapor phase osmometry of about 300 to about 3000. The PB can be prepared by well-known techniques such as the Friedel-Crafts polymerization of feedstocks comprising isobutylene, or they can be purchased from a number of commercial suppliers such as Amoco Chemical Company, Chicago, Ill., which markets polybutenes under the tradename Indopol ®. A preferred number average molecular weight for PB is in the range of about 300 to about 2500.

PB can be added directly to polypropylene or it can be added via a masterbatch prepared by adding PB to polypropylene at weight ratios of 0.2 to 0.3 based on polypropylene in a mixing device such as a compounding extruder with the resulting masterbatch blended with polypropylene in an amount to achieve a desired level of PB. For making the self-bonded webs used in making the composites of the present invention, the weight ratio of PB typically added to polypropylene can range from about 0.01 to about 0.15. When a weight ratio of PB below about 0.01 is added to polypropylene, little beneficial effects such as better hand and improved softness are shown in the fabrics, and when polybutene is added at a weight ratio above about 0.15, minute amounts of PB can migrate to the surface which may detract from the fabric appearance. Blends of polypropylene and PB can have a weight ratio of polypropylene in the range of about 0.99 to about 0.85, preferably about 0.99 to about 0.9, and a weight ratio of PB in the range of about 0.01 to about 0.15, preferably about 0.01 to about 0.10.

Blends of polypropylene and LLDPE can be formulated by blending polypropylene resin in the form of pellets or powder with LLDPE in a mixing device such as a drum tumbler and the like. The resin blend of polypropylene and LLDPE with optional stabilizer additive package can be introduced to a polymer melt mixing device such as a compounding extruder of the type typically used to produce polypropylene product in a polypropylene production plant and compounded at temperatures between about 300° F. and about 500° F. Although blends of polypropylene and LLDPE can range from a weight ratio of nearly 1.0 for polypropylene to a weight ratio of nearly 1.0 for LLDPE, typically, the blends of polypropylene and LLDPE useful for making self-bonded webs used in the composites of the present invention can have a weight ratio of polypropylene in the range of about 0.99 to about 0.85, preferably in the range of about 0.98 to about 0.92, and a weight ratio of LLDPE in the range of about 0.01 to about 0.15, preferably in the range of about 0.02 to about 0.08. For weight ratios less than 0.01 the softer hand properties imparted from the LLDPE are not obtained and for weight ratios above 0.15 less desirable physical properties and a smaller processing window are obtained.

The linear low density polyethylenes which can be used in the self-bonded, fibrous, nonwoven webs used in making the composites of the present invention can be random copolymers of ethylene with 1 to 15 weight percent of higher olefin co-monomers such as propylene, n-butene-1, n-hexene-1, n-octene-1 or 4-methylpentene-1 produced over transition metal coordination catalysts. Such linear low density polyethylenes can be produced in liquid phase or vapor phase processes. The preferred density of the linear low density polyethylene is in the range of about 0.91 to about 0.94 g/cc.

Figure 1:
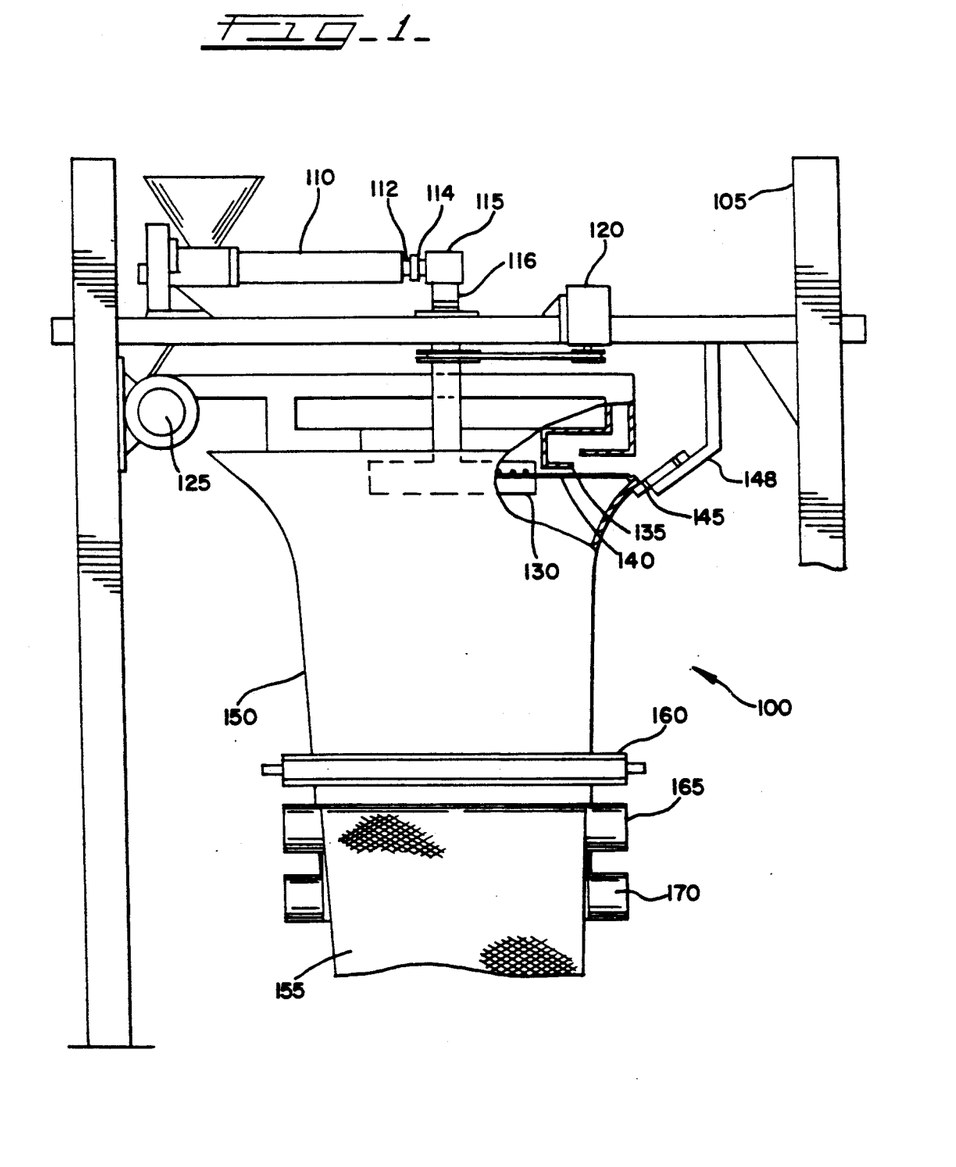
FIG. 1 is a shcematic illustration of the system used to produce the uniform basis weight self-bonded, fibrous nonwoven web used for at least one layer of the self-bonded nonwoven web and cross-laminated thermoplastic net-like web composite of the present invention.

One embodiment of the uniform basis weight self-bonded, fibrous nonwoven web used for at least one layer of the self-bonded nonwoven web and cross-laminated thermoplastic net-like web composite of the present invention can be produced by a system 100, schematically shown in FIG. 1. System 100 includes an extruder 110 which extrudes a fiber forming material such as a thermoplastic polymer melt through feed conduit and adapter 112 to a rotary union 115. A positive displacement melt pump 114 can be located in the feed conduit 112 for greater accuracy and uniformity of polymer melt delivery. An electrical control can be provided for selecting the rate of extrusion and displacement of the extrudate through the feed conduit 112. Rotary drive shaft 116 is driven by motor 120 at a speed selected by a control means (not shown) and is coupled to rotary die 130. Radial air aspirator 135 is located around rotary die 130 and is connected to air blower 125. Air blower 125, air aspirator 135, rotary die 130, motor 120 and extruder 110 are supported on or attached to frame 105.

In operation, fibers are extruded through and thrown from the rotary die 130 by centrifugal action into a high velocity air stream provided by air aspirator 135. The air drag created by the high velocity air causes the fibers to be drawn down from the rotary die 130 and also to be stretched or attenuated. A web forming plate 145 in the shape of an annular ring surrounds the rotary die 130. As rotary die 130 is rotated and fibers 140 are extruded, the fibers 140 strike the web forming plate 145. Web forming plate 145 is attached to frame 105 with support arm 148. Fibers 140 are self-bonded during contact with each other and plate 145, thus forming a tubular nonwoven web 150. The tubular nonwoven web 150 is then drawn through the annulus of web forming plate 145 by pull rolls 170 and 165, through nip rolls 160 supported below rotary die 130 which spreads the fabric into a flat two-ply composite 155 which is collected by pull rolls 165 and 170 and can be stored on a roll (not shown) in a standard fashion.

Figure 2:
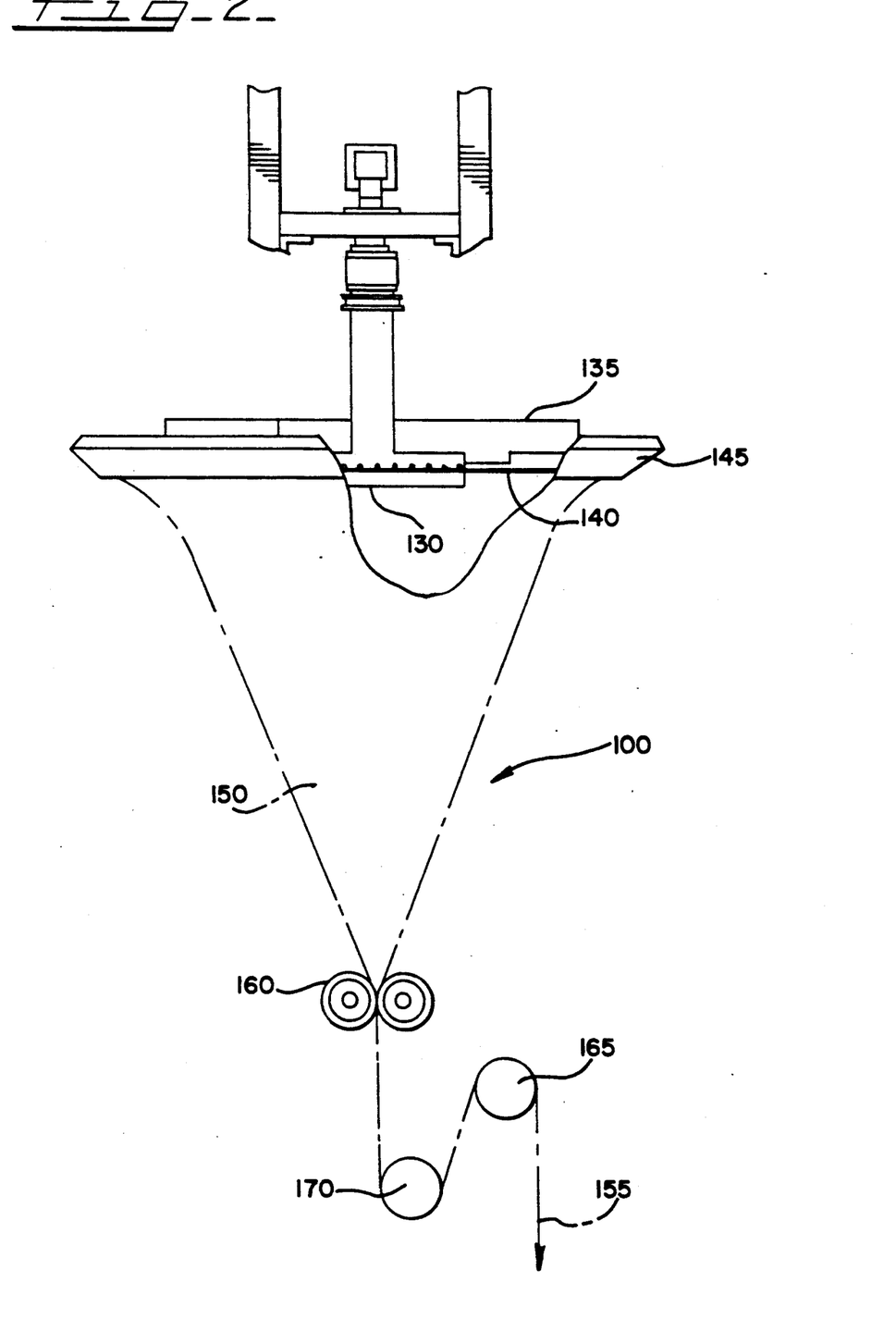
FIG. 2 is a side view of the system of FIG. 1.

FIG. 2 is a side view of system 100 of FIG. 1 schematically showing fibers 140 being extruded from rotary die 130, attenuated by the high velocity air from air aspirator 135, and contacting of fibers 140 on web forming plate 145 to form tubular nonwoven web 150. Tubular nonwoven web 150 is drawn through nip rolls 160 by pull rolls 170 and 165 to form flat two-ply composite 155.

The self-bonded, nonwoven web and cross-laminated thermoplastic net-like web composites of the present invention can be produced from at least one layer of a uniform basis weight self-bonded web having a plurality of substantially randomly disposed, substantially continuous filaments having a basis weight of about 0.1 oz/yd$^2$ or greater bonded to at least one layer of a cross-laminated thermoplastic net-like web having a basis weight of about 0.2 oz/yd$^2$ or greater. A layer of a polymeric coating composition can be used to provide a combination fluid resistant and adhesive coating layer between the self-bonded nonwoven web and the cross-laminated thermoplastic net-like web. In one embodiment for making the self-bonded, nonwoven web and cross-laminated thermoplastic net-like web composites of the present invention, a coating process with a film forming apparatus such as a melt extruder is used to extrude a molten film from a die having a slit opening dimension in the range of about 1 to about 30 mils. The extrusion pressure within the die can be in the range of about 1,000 to 1,500 psi, and the molten film as it exits the die can be at a temperature in the range of about 500° F. to 580° F. for ethylene-methyl acrylate copolymer as a polymeric coating composition. The molten extruded film can then be contacted with a self-bonded nonwoven web supplied from a primary unwind roll and passed through two counter rotating rolls such as a nip roll and a chill roll having diameters typically in the range of about 4 to 12 inches. The self-bonded web can be in direct contact with the nip roll, and the molten extruded film can make contact with the self-bonded web between the nip and chill rolls. The cross-laminated thermoplastic net-like web can be supplied from an auxiliary unwind roll such that a composite comprising a layer of a self-bonded web, a layer of a polymeric coating composition and a layer of a cross-laminated thermoplastic net-like web is continuously formed between the nip and chill rolls. A pressure in the range of about 25 to 200 lbs/linear inch can be applied in the nip. The temperature of the chill roll can be in the range of about 60° to 75° F. The rate at which the self-bonded nonwoven web and cross-laminated thermoplastic net-like web can be formed in the nip can be in the range of about 75 to 900 ft/minute.

Factors such as the thermoplastic used for the various web layers, the desired composite production rate, the composite basis weight; process parameters such as the temperature of the nip and chill rolls; the pressure exerted on the composite by the rolls and the speed of the nonwoven webs fed through the rolls can be varied to achieve the desired results.

The uniform basis weight self-bonded nonwoven web can be supplied directly from the process described above or from an unwind roll. The web can be either a single-ply or a multi-ply fabric. Preferably, the nonwoven web has a single or multiple two-ply structure such that a self-bonded web having a nominal basis weight of about 1.0 oz/yd$^2$ can comprise two plies of a self-bonded web each having a nominal basis weight of about 0.5 oz/yd$^2$ or two two-ply self-bonded web fabrics with each of the four plies having a nominal basis weight of about 0.25 oz/yd$^2$. A self-bonded web having a total basis weight of 5.0 oz/yd$^2$ would require 10 two-ply self-bonded web fabrics with each ply having a nominal basis weight of 0.25 oz/yd$^2$ For self-bonded webs produced from polypropylene, two-ply fabrics are made with single ply basis weights of about 0.1 to about 0.25 oz/yd$^2$ and self-bonded webs having heavier basis weights are formed from multiple layers of these two-ply fabrics in order to obtain self-bonded webs with the desired softness, drapeability and strength. For blends of polypropylene with polybutene or linear low density polyethylene the single ply basis weight of the nonwoven web can be greater than for polypropylene while still retaining softness and drapability properties. Additionally, the basis weight of the two-ply self-bonded web is enhanced by the excellent uniform basis weight of the single plies that make up the two-ply self-bonded webs.

The self-bonded nonwoven web comprising a plurality of substantially randomly disposed, substantially continuous thermoplastic filaments used as the layer providing excellent coverage and good strength to the composite has a very uniform basis weight. The uniform basis weight self-bonded nonwoven web allows lower basis weight self-bonded nonwoven webs to be used and benefits the consumer with a lighter weight and more economical composite product.

Among the embodiments of the self-bonded nonwoven web and cross laminate composites of the present invention is a multilayer composite comprising a layer of a cross-laminated thermoplastic net-like web located between and adhered to two layers of the same or different uniform basis weight self-bonded nonwoven webs. Using an intermediate layer of a cross-laminated thermoplastic net-like web as a further strength and fabric stabilization layer, a light weight cover fabric with uniform coverage and good strength can be made comprising two layers of self-bonded, nonwoven webs bonded to a layer of a cross-laminated thermoplastic net-like web inserted between the nonwoven webs. The two layers of uniform basis weight self-bonded nonwoven webs can be the same or different in terms of basis weight, material of construction, additives incorporated into the material of construction, surface treatment of the nonwoven webs and the like. For example, a composite can be constructed for use as protective covers for items such as automobiles, trucks, recreation vehicles, vans, mobile homes, motorcycles, air conditioners, electric motors and the like. The self-bonded nonwoven layer which may come in contact with the item covered can comprise a thermoplastic material such as blends of polypropylene and polybutene and/or linear low density polyethylene and which produce a nonwoven layer having a softer hand. The other self-bonded nonwoven web layer of such a multilayer composite can be made from the same material or a different material such as a material having a different thermoplastic composition, a material which has been surface treated with substances to improve antistatic, antimicrobial properties and the like, and a material which includes additives such as fire retardants, UV stabilizers, colorants, dyes, fillers and the like.

Another advantage of the composites of the present invention is that previously prepared self-bonded nonwoven webs and cross-laminated thermoplastic net-like webs can be used from unwind rolls to produce a composite with the desired basis weight and physical properties. This enables composites to be produced in which various layers of the self-bonded nonwoven webs of the composites can have different basis weights, different pigments or different surface treatments before the desired composites are produced. In the embodiment where blends of polypropylene and polybutene and/or LLDPE are used to make the self-bonded nonwoven webs, self-bonded nonwoven webs are formed which can have a softer hand than webs formed from only polypropylene.

Other self-bonded nonwoven web and cross-laminated thermoplastic net-like web composites can be formed, including composites having a uniform basis weight self-bonded web and a cross-laminated thermoplastic net-like web laminated together by thermal bonding using heat and pressure of a calendering operation or by using a polymeric coating composition layer as an adhesive layer. These self-bonded nonwoven web and cross laminate composites are particularly useful, for example, as a stable fabric for primary carpet backing in which carpets are printed with a geometric pattern after a tufting operation and before the addition of a secondary backing as a finishing step. By using the above described embodiment of the instant invention, a primary carpet backing is provided that has sufficient fabric stability to allow geometric printing of a pattern on the carpet without mis-aligned prints. Subsequent to the printing operation, a secondary backing, for example of woven synthetic or natural yarns can be added to the carpet.

The above described composite comprising a cross-laminated thermoplastic net-like web adhesively bonded to a layer of a uniform basis weight self-bonded nonwoven web is particularly useful as wallcovering backing wherein the cross-laminated thermoplastic net-like web layer of the composite is next to the wallboard and the self-bonded web is next to the wallcovering material. This composite structure allows the wallcovering material which is adhesively bonded to the wallboard to be removed when desired such that nearly all of the wallcovering and composite material is removed from the wall and with minimal disruption of the wallboard.

If desired, the self-bonded nonwoven web and thermoplastic net-like web composites of the present invention can have various other layers laminated or bonded to the composite such as coating materials, carded webs, woven fabrics, nonwoven fabrics, porous films, impervious films, metallic foils and the like.

In addition to the product applications described above the composites of the present invention can find use in such diverse applications as upholstery fabric for the bottom sides of furniture to mask springs, etc., light weight fence structures, erosion control fabric, ground cover, material for bags and containers, and the like.

The preparations of various uniform basis weight self-bonded nonwoven webs used in making the composites of the present invention and examples appearing below are given for the purpose of further illustrating the present invention and are not to be intended in any way to limit the scope of the invention. Test procedures used to determine properties reported in the examples below are as follows:

Tensile and Elongation—Test specimens are used to determine tensile strength and elongation according to ASTM Test Method D-1692. Grab tensile strength can be measured in the MD on 1 inch wide samples of fabric or in the CD and is reported as a peak value in units of pounds or grams. A high value is desired for tensile strength.

Elongation can also be measured in the MD or CD and is reported as a peak value in units of percent. Lower values are desired for elongation.

Trapezoidal Tear Strength—The trapezoidal tear strength (Trap Tear) is determined by ASTM Test Method D-1117 and can be measured in the MD or CD and is reported in units of pounds. High value are desired for Trap Tear.

Fiber Denier—The fiber diameter is determined by comparing a fiber specimen sample to a calibrated reticle under a microscope with suitable magnification. From known polymer densities, the fiber denier is calculated.

Basis Weight—The basis weight for a test sample is determined by ASTM Test Method D-3776 Option C.

Basis Weight Uniformity Index—The BWUI is determined for a nonwoven web by cutting a number of unit area and larger area samples from the nonwoven web. The method of cutting can range from the use of scissors to stamping out unit areas of material with a die which will produce a consistently uniform unit area sample of nonwoven web. The shape of the unit area sample can be square, circular, diamond or any other convenient shape. The unit area is 1 $in^2$, and the number of samples is sufficient to give a 0.95 confidence interval for the weight of the samples. Typically, the number of samples can range from about 40 to 80. From the same nonwoven web an equivalent number of larger area samples are cut and weighed. The larger samples are obtained with appropriate equipment with the samples having areas which are N times larger than the unit area samples, where N is about 12 to about 18. The average basis weight is calculated for both the unit area sample and the larger area sample, with the BWUI ratio determined from the average basis weight of the unit area divided by the average basis weight of the larger area. Materials which have unit area and/or area average basis weights determined with standard deviations greater than 10% are not considered to have uniform basis weights as defined herein.

Preparation examples of uniform basis weight self-bonded nonwoven webs of polypropylene, of a blend of polypropylene and polybutene, of a blend of polypropylene and linear low density polyethylene and comparative examples of commercially available polypropylene spunbond nonwoven materials are given below.

Self-Bonded Nonwoven Polypropylene Web Preparation

A polypropylene resin, having a nominal melt flow rate of 35 g/10 min, was extruded at a constant extrusion rate into and through a rotary union, passages of the rotating shaft and manifold system of the die and spinnerets to an annular plate similar to the equipment as shown in FIG. 1 and described above.

The process conditions were:

| Extrusion conditions | |
|---|---|
| Temperature, °F. | |
| Zone-1 | 450 |
| Zone-2 | 500 |
| Zone-3 | 580 |
| Adapter | 600 |
| Rotary Union | 425 |
| Die | 425 |
| Pressure, psi | 200–400 |
| Rotary die conditions | |
| Die rotation, rpm | 2500 |
| Extrudate rate, lb/hr/orifice | 0.63 |
| Air quench conditions | |
| Air quench pressure, inches of $H_2O$ | 52 |
| Basis Weight Uniformity Index | |
| Thickness, mils | |
| Number of Samples | 60 |
| Average Thickness | 11.04 |
| Coefficient of Variation | 1.50075 |
| Standard Deviation | 1.22505 |
| Range | 6 |
| Basis Weight | |
| Number of Samples | 60 |
| Test Specimen Area, $in^2$ | 1 |
| Weight, g | |
| Average | 0.02122 |
| Coefficient of Variation | $1.9578 \times 10^{-6}$ |
| Standard Deviation | $1.3992 \times 10^{-3}$ |
| Range | $5.3 \times 10^{-3}$ |
| Basis Weight, $oz/yd^2$ | 0.9692 |
| Number of Samples | 60 |

*-continued*

| | |
|---|---|
| Test Specimen Area, $in^2$ | 16 |
| Weight, g | |
| Average | 0.3370 |
| Coefficient of Variation | $2.6348 \times 10^{-4}$ |
| Standard Deviation | $1.6232 \times 10^{-2}$ |
| Range | 0.068 |
| Basis Weight, $oz/yd^2$ | 0.9620 |
| Basis Weight Uniformity Index (BWUI) | 1.0075 |

A nominal 1.0 $oz/yd^2$ polypropylene self-bonded nonwoven web was prepared by the method described above and calendered with a hard steel, embossed calender roll and a hard steel, smooth calender roll with both rolls maintained at a temperature of 260° F. with an embossing pattern of 256 squares/$in^2$ with the squares angled diagonally such that the squares present a diamond-like appearance in the machine or cross-machine direction with the bonding area being a nominal 16 percent of the surface area of the composite. A pressure of 400 psi was maintained on the web. Filament denier, basis weights for 1 in × 1 in square and 4 in × 4 in square samples, cross machine direction and machine direction tensile strengths were determined for this self-bonded nonwoven web as well as for nominal 1.0 $oz/yd^2$ basis weight spunbond materials such as Kimberly-Clark's Accord (Comparative A), James River's Celestra (Comparative B) and Wayn-Tex's Elite (Comparative C). These properties are summarized in Tables I–V below.

TABLE I

NONWOVEN WEB PROPERTIES
Basis Weight - 4 in × 4 in Square Samples

| Property | Self-bonded Nonwoven Web | Comparative A | Comparative B | Comparative C |
|---|---|---|---|---|
| Number of Samples | 60 | 60 | 60 | 18 |
| Sample Area, $in^2$ | 16 | 16 | 16 | 16 |
| Basis Weight, $oz/yd^2$ | | | | |
| Average | 0.968667 | 0.998833 | 1.01317 | 0.967778 |
| Mediam | 0.97 | 1.01 | 1.00 | 0.98 |
| Variance | $2.43887 \times 10^{-3}$ | $7.09523 \times 10^{-3}$ | $6.84234 \times 10^{-3}$ | $1.42418 \times 10^{-2}$ |
| Minumum | 0.86 | 0.8 | 0.82 | 0.78 |
| Maximum | 1.07 | 1.21 | 1.2 | 1.21 |
| Range | 0.21 | 0.41 | 0.38 | 0.43 |
| Standard Deviation (SD) | 0.0493849 | 0.0842332 | 0.0827185 | 0.119339 |
| SD, % of Average | 5.10 | 8.43 | 8.16 | 12.33 |

TABLE II

NONWOVEN WEB PROPERTIES
Basis Weight - 1 in × 1 in Square Samples

| Property | Self-bonded Nonwoven Web | Comparative A | Comparative B | Comparative C |
|---|---|---|---|---|
| Number of Samples | 60 | 60 | 60 | 60 |
| Sample Area, $in^2$ | 1 | 1 | 1 | 1 |
| Basis Weight, $oz/yd^2$ | | | | |
| Average | 0.993667 | 0.9665 | 0.9835 | 0.945167 |
| Median | 0.99 | 0.965 | 0.97 | 0.97 |
| Variance | $4.50836 \times 10^{-3}$ | 0.0186774 | 0.0245214 | 0.0251847 |
| Minimum | 0.88 | 0.69 | 0.69 | 0.62 |
| Maximum | 1.17 | 1.26 | 1.32 | 1.34 |
| Range | 0.29 | 0.57 | 0.63 | 0.72 |
| Standard Deviation (SD) | 0.0671443 | 0.136665 | 0.156593 | 0.158697 |
| SD, % of Average | 6.76 | 14.14 | 15.92 | 16.79 |
| BWUI | 1.026 | 0.968* | 0.971* | 0.977* |

*SD 10% of average for one or both basis weights.

TABLE III

NONWOVEN WEB PROPERTIES
Filament Denier

| Property | Self-bonded Nonwoven Web | Comparative A | Comparative B | Comparative C |
|---|---|---|---|---|
| Numbers of Samples | 100 | 100 | 100 | 100 |
| Denier | | | | |
| Average | 2.254 | 2.307 | 3.962 | 5.295 |
| Median | 1.7 | 2.2 | 4.2 | 5.8 |
| Variance | 1.22473 | 0.206718 | 0.326622 | 0.82048 |
| Minimum | 0.9 | 1.2 | 2.8 | 2.2 |
| Maximum | 5.8 | 4.2 | 5.8 | 7.7 |
| Range | 4.9 | 3 | 3 | 5.5 |
| Standard Deviation (SD) | 1.10668 | 0.454663 | 0.571509 | 0.905803 |
| SD, % of Average | 49.10 | 19.71 | 14.42 | 17.11 |

TABLE IV

NONWOVEN WEB PROPERTIES
Cross Machine Direction Tensile Strength

| Property | Self-bonded Nonwoven Web | Comparative A | Comparative B | Comparative C |
|---|---|---|---|---|
| Numbers of Samples | 30 | 30 | 30 | 18 |
| Tensile Strength, lb | | | | |
| Average | 4.60217 | 9.14053 | 2.94907 | 4.00072 |
| Median | 4.694 | 9.035 | 2.772 | 3.9435 |
| Variance | 0.19254 | 2.09982 | 0.271355 | 1.71677 |
| Minimum | 3.742 | 5.318 | 2.166 | 1.399 |
| Maximum | 5.374 | 11.56 | 4.443 | 6.15 |
| Range | 1.632 | 6.242 | 2.277 | 4.751 |
| Standard Deviation (SD) | 0.438794 | 1.44908 | 0.520918 | 1.31025 |
| SD, % of Average | 9.53 | 15.85 | 17.66 | 32.75 |

TABLE V

NONWOVEN WEB PROPERTIES
Machine Direction Tensile Strength

| Property | Self-bonded Nonwoven Web | Comparative A | Comparative B | Comparative C |
|---|---|---|---|---|
| Numbers of Samples | 30 | 30 | 30 | 18 |
| Tensile Strength, lb | | | | |
| Average | 4.7511 | 5.51813 | 8.56907 | 6.93222 |
| Median | 4.7675 | 5.4755 | 8.7675 | 6.4725 |
| Variance | 0.0789548 | 0.686962 | 1.22762 | 5.84547 |
| Minimum | 4.15 | 3.71 | 6.489 | 3.436 |
| Maximum | 5.251 | 7.04 | 10.21 | 12.16 |
| Range | 1.101 | 3.33 | 3.721 | 8.724 |
| Standard Deviation (SD) | 0.280989 | 0.828832 | 1.10798 | 2.41774 |
| SD, % of Average | 5.91 | 15.02 | 12.93 | 34.88 |

Self-Bonded Nonwoven Web Preparation From A Blend Of Polypropylene And Polybutene A blend of 93 wt % of a polypropylene having a nominal melt flow rate of 38 g/10 min and 7 wt % of polybutene having a nominal number average molecular weight of 1290 was melt-blended in a Werner & Pfleiderer ZSK-57 twin-screw extruder and Luwa gear pump finishing line. The resulting product was extruded at a constant extrusion rate into and through a rotary union, passages of the rotating shaft and manifold system of the die and spinnerets to an annular plate in the equipment as shown in FIG. 1 and described above.

The process conditions were:

| Extrusion conditions | |
|---|---|
| Temperature, °F. | |
| Zone-1 | 435 |
| Zone-2 | 450 |
| Zone-3 | 570 |
| Adapter | 570 |
| Rotary Union | 550 |

-continued

| Die | 450 |
|---|---|
| Screw rotation, rpm | 50 |
| Pressure, psi | 800 |
| Rotary die conditions | |
| Die rotation, rpm | 2100 |
| Extrudate rate, lb/hr/orifice | 0.78 |
| Product physical characteristics | |
| Filament denier (average) | 3–4 |
| Basis weight, oz/yd$^2$ | 1.25 |
| Grab tensile MD, lbs | 13.4 |
| CD, lbs | 9.0 |
| Elongation MD, % | 150 |
| CD, % | 320 |
| Trap tear MD, lbs | 7.5 |
| CD, lbs | 5.8 |

Self-Bonded Nonwoven Web Preparation From A Blend Of Polypropylene And Linear Low Density Polyethylene A blend of 95 wt % of a polypropylene having a nominal melt flow rate of 38 g/10 min and 5 wt % of a linear low density polyethylene having a nominal density of 0.94 g/cc was melt-blended in a 2.5-inch Davis Standard single-screw extruder. The resulting product was extruded at a constant extrusion rate into and through a rotary union, passages of the rotating shaft and manifold system of the die and spinnerets to an annular plate in the equipment as shown in FIG. 1 and described above.

The process conditions were:

| Extrusion conditions | |
|---|---|
| Temperature, °F. | |
| Zone-1 | 490 |
| Zone-2 | 540 |
| Zone-3 | 605 |
| Adapter | 605 |
| Rotary Union | 550 |
| Die | 450 |
| Screw rotation, rpm | 40 |
| Pressure, psi | 1000 |
| Rotary die conditions | |
| Die rotation, rpm | 2100 |
| Extrudate rate, lb/hr/orifice | 0.65 |
| Air quench conditions | |
| Air quench pressure, in of H$_2$O | 55 |
| Product physical characteristics | |
| Basis weight, oz/yd$^2$ | 0.25 |

EXAMPLE 1

A two-layer self-bonded nonwoven web and cross-laminated thermoplastic net-like web composite was made using a layer of a uniform basis weight self-bonded, fibrous nonwoven web and a layer of cross-laminated thermoplastic net-like web. The self-bonded nonwoven web was prepared in the form of a two-ply web from a PP having a nominal melt flow rate of 35 g/10 min with 0.2 wt % of an organic yellow pigment and having a uniform basis weight of 0.55 oz/yd$^2$ (nominal 0.25 oz/yd$^2$ per ply) with a BWUI and standard deviation of basis weights similar to the self-bonded web described in Table II and was wound on an unwind roll. The cross-laminated thermoplastic net-like web obtained from Nippon Petrochemicals Co. Ltd. was a polyethylene fabric cross laminated airy fabric designated as CLAF S having a basis weight of 0.84 oz/yd$^2$ and wound on an unwind roll. The layers of the self-bonded web and cross-laminated thermoplastic net-like web were fed from the unwind rolls to a calendering line and thermobonded on an in-line 120-inch wide calender with two calender rolls maintained at a temperature of 149° F. for the top roll and 284° F. for the bottom roll. A pressure of 320 pounds per linear inch (pli) was maintained on the layers to thermally bond the layers and form a self-bonded nonwoven web and cross-laminated thermoplastic net-like web composite at a speeds of 200, 300, 400 and 500 feet per minute (fpm). The physical properties of the composite and composite components are given in Table VI.

TABLE VI

| Material | Ex. 1a | Ex. 1b | Ex. 1c | Ex. 1d | CLAF S | Self-Bonded Web |
|---|---|---|---|---|---|---|
| Calendar Speed, fpm | 200 | 300 | 400 | 500 | — | — |
| Basis Weight, oz/yd$^2$ | 1.3 | 1.4 | 1.4 | 1.3 | 0.84 | 0.55 |
| Grab Strength, lb | | | | | | |
| MD | 28.0 | 28.4 | 32.3 | 26.4 | 21.0 | 8.3 |
| CD | 48.4 | 52.8 | 40.1 | 41.9 | 34.0 | 8.3 |
| Elongation, % | | | | | | |
| MD | 12 | 13 | 13 | 13 | 13 | 129 |
| CD | 24 | 26 | 21 | 21 | 18 | 140 |
| Air Permeability, cfm | 634 | 556 | 592 | 620 | >760 | >760 |

EXAMPLE 2

A two-layer self-bonded nonwoven web and cross-laminated thermoplastic net-like web composite was made using a layer of a uniform basis weight self-bonded, fibrous nonwoven web and a layer of cross-laminated thermoplastic net-like web. The self-bonded nonwoven web was in the form of three two-ply webs calendered together made from a PP having a nominal melt flow rate of 35 g/10 min with 0.2 wt % of an organic yellow pigment and having a uniform basis weight of 1.52 oz/yd$^2$ (nominal 0.25 oz/yd$^2$ per ply) with a BWUI and standard deviation of basis weights similar to the self-bonded web described in Table II was wound on an unwind roll. The cross-laminated thermoplastic net-like web obtained from Nippon Petrochemicals Co. Ltd. was a polyethylene fabric cross laminated airy fabric designated as CLAF S having a basis weight of 0.84 oz/yd$^2$ and wound on an unwind roll. The layers of the self-bonded web and cross-laminated thermoplastic net-like web were fed from the unwind rolls to a calendering line and thermobonded on an in-line 120-inch wide calender with two calender rolls maintained at a temperature of 149° F. for the top roll and 284° F. for the bottom roll. A pressure of 320 pli was maintained on the layers to thermally bond the layers and form a self-bonded nonwoven web and cross-laminated thermoplastic net-like web composite at a speeds of 200, 300, 400 and 500 fpm. The physical properties of the composite and composite components are given in Table VII.

TABLE VII

| Material | Ex. 2a | Ex. 2b | Ex. 2c | Ex. 2d | CLAF S | Self-Bonded Web |
|---|---|---|---|---|---|---|
| Calendar Speed, fpm | 200 | 300 | 400 | 500 | — | — |
| Basis Weight, oz/yd$^2$ | 2.3 | 2.3 | 2.3 | 2.2 | 0.84 | 1.52 |
| Grab Strength, lb | | | | | | |
| MD | 41.8 | 37.0 | 36.5 | 34.7 | 21.0 | 22.2 |
| CD | 5.30 | 49.4 | 52.3 | 52.4 | 34.0 | 25.9 |
| Elongation, % | | | | | | |
| MD | 13 | 37 | 14 | 14 | 13 | 153 |
| CD | 25 | 23 | 83 | 25 | 18 | 215 |

TABLE VII-continued

| Material | Ex. 2a | Ex. 2b | Ex. 2c | Ex. 2d | CLAF S | Self-Bonded Web |
|---|---|---|---|---|---|---|
| Air Permeability, cfm | 192 | 172 | 167 | 145 | >760 | 348 |

That which is claimed is:

1. A self-bonded nonwoven web and thermoplastic net-like web composite comprising,
    at least one layer of a uniform basis weight self-bonded, fibrous nonwoven web comprising a plurality of substantially randomly disposed, substantially continuous thermoplastic filaments wherein said web has a Basis Weight Uniformity Index of 1.0±0.05 determined from average basis weights having standard deviations of less than 10%, adhered to
    at least one layer of a thermoplastic net-like web comprising a net-like structure of a multiplicity of aligned thermoplastic elements wherein a first segment of elements is aligned at about a 45° to about 90° angle to a second segment of elements thereby defining a border for multiple void areas of the net-like structure.

2. The self-bonded nonwoven web and thermoplastic net-like web composite of claim 1 wherein said thermoplastic net-like web comprises a cross-laminated net-like web.

3. The composite of claim 1 wherein the Basis Weight Uniformity Index has a value of 1.0±0.03 as determined from average basis weights having standard deviations of less than 10%.

4. The composite of claim 1 wherein said thermoplastic filaments have deniers in the range of about 0.5 to about 20.

5. The composite of claim 1 wherein said uniform basis weight selfbonded nonwoven web comprises a thermoplastic selected from the group consisting of polyolefins, blends of polyolefins, polyamides and polyesters.

6. The composite of claim 5 wherein said polyolefins comprise a polypropylene having a melt flow rate in the range of about 10 to about 80 g/10 min as measured by ASTM D-1238.

7. The composite of claim 5 wherein said blends of polyolefins comprise a polypropylene and a polybutene or a linear low density polyethylene wherein said polypropylene has a melt flow rate in the range of about 10 to about 80 g/10 min as measured by ASTM D-1238, said polybutene has a number average molecular weight in the range of about 300 to about 2,500 and said linear low density polyethylene has a density in the range of about 0.91 to about 0.94 g/cc.

8. A self-bonded nonwoven web and thermoplastic net-like web composite comprising,
    at least one layer of a uniform basis weight self-bonded, fibrous nonwoven web comprising a plurality of substantially randomly disposed, substantially continuous thermoplastic filaments comprising a random copolymer of propylene and ethylene wherein said web has a Basis Weight Uniformity Index of 1.5±0.05 determined from average basis weights having standard deviations of less than 10%, adhered to
    at least one layer of a thermoplastic net-like web comprising a cross-laminated net-like web comprising a thermoplastic selected from the group consisting of polyolefins, combinations of polyolefins and polyesters.

9. The composite of claim 8 wherein said cross-laminated net-like web comprises a polypropylene.

10. The composite of claim 8 wherein said cross-laminated net-like web comprises a high density polyethylene and a low density polyethylene.

11. A self-bonded nonwoven web and cross-laminated thermoplastic net-like web composite having a basis weight in the range of about 0.2 oz/yd$^2$ or greater comprising,
    at least one layer of a uniform basis weight self-bonded, fibrous nonwoven web having a basis weight of about 0.1 oz/yd$^2$ or greater and a Basis Weight Uniformity Index of 1.0±0.05 determined from average basis weights having standard deviations of less than 10% and comprising a plurality of substantially randomly disposed, substantially continuous thermoplastic filaments wherein said thermoplastic filaments have deniers in the range of about 0.5 to about 20 and comprise a thermoplastic selected from the group consisting of polypropylene, a random copolymer of propylene and ethylene and a blend of polypropylene and polybutene or linear low density polyethylene wherein said web is adhered to
    at least one layer of a cross-laminated thermoplastic net-like web having a basis weight of about 0.1 oz/yd$^2$ or greater comprising a thermoplastic selected from the group consisting of polyolefins, combinations of polyolefins, and polyesters.

12. The composite of claim 11 wherein said uniform basis weight self-bonded nonwoven web comprises a polypropylene having a melt flow rate in the range of about 10 to about 80 g/10 min as measured by ASTM D-1238.

13. The composite of claim 11 wherein said uniform basis weight self-bonded nonwoven web comprises a blend of a polypropylene and a polybutene wherein said polypropylene has a melt flow rate in the range of about 10 to about 80 g/10 min as measured by ASTM D-1238 and has a weight ratio of about 0.99 to about 0.85 and wherein said polybutene has a number average molecular weight in the range of about 300 to about 2,500 and has a weight ratio of about 0.01 to about 0.15.

14. The composite of claim 11 wherein said uniform basis weight self-bonded nonwoven web comprises a blend of a polypropylene and a linear low density polyethylene wherein said polypropylene has a melt flow rate in the range of about 10 to about 80 g/10 min as measured by ASTM D-1238 and has a weight ratio of about 0.99 to about 0.85 and wherein said linear low density polyethylene has a density in the range of about 0.91 to about 0.94 g/cc and has a weight ratio of about 0.01 to about 0.15.

15. The composite of claim 11 wherein said cross-laminated thermoplastic net-like web comprises a thermoplastic selected from the group consisting of polyolefins, combinations of polyolefins and polyesters.

16. The composite of claim 11 having a basis weight in the range of about 0.4 to about 2.0 oz/yd$^2$ comprising two layers of a uniform basis weight self-bonded, fibrous nonwoven web comprising a polypropylene and having a Basis Weight Uniformity Index of 1.0±0.05 determined from average basis weights having standard deviations of less than 10% and one layer of a cross-laminated thermoplastic net-like web comprising a polypropylene or high density polyethylene and low density polyethylene located between and integrally adhered to the two layers of the self-bonded web.

17. The composite of claim 16 in the form of a backing for wallcovering.

18. A self-bonded nonwoven web and cross-laminated thermoplastic net-like web composite having a basis weight of about 0.4 oz/yd$^2$ or greater comprising, at least one layer of a uniform basis weight self-bonded, fibrous nonwoven web having a basis weight of about 0.1 oz/yd$^2$ or greater and a Basis Weight Uniformity Index of 1.0±0.05 determined from average basis weights having standard deviations of less than 10% comprising a plurality of substantially randomly disposed, substantially continuous thermoplastic filaments wherein the filaments comprise a thermoplastic selected from the group consisting of polypropylene, a random copolymer of propylene and ethylene, and a blend of polypropylene and polybutene or linear low density polyethylene, a layer of a cross-laminated thermoplastic net-like web having a basis weight in the range of about 0.1 oz/yd$^2$ or greater comprising a thermoplastic selected from the group consisting of polyolefins, combinations of polyolefins and polyesters, and a layer of a polymeric coating composition having a basis weight in the range of about 0.2 oz/yd$^2$ or greater comprising a composition selected from the group consisting of ethylene-methyl acrylate copolymer, ethylene-vinyl acetate copolymer and linear low density polyethylene located between and integrally adhered to said self-bonded nonwoven web layer and said cross-laminated thermoplastic net-like web layer.

19. The composite of claim 18 having a basis weight in the range of about 0.4 to about 5.0 oz/yd$^2$.

20. The composite of claim 18 in the form of a primary carpet backing.

* * * * *